INVENTORS
R. Russell Roberts
Worthy J. F. Forward
BY
Harold E. Stonebraker
THEIR ATTORNEY

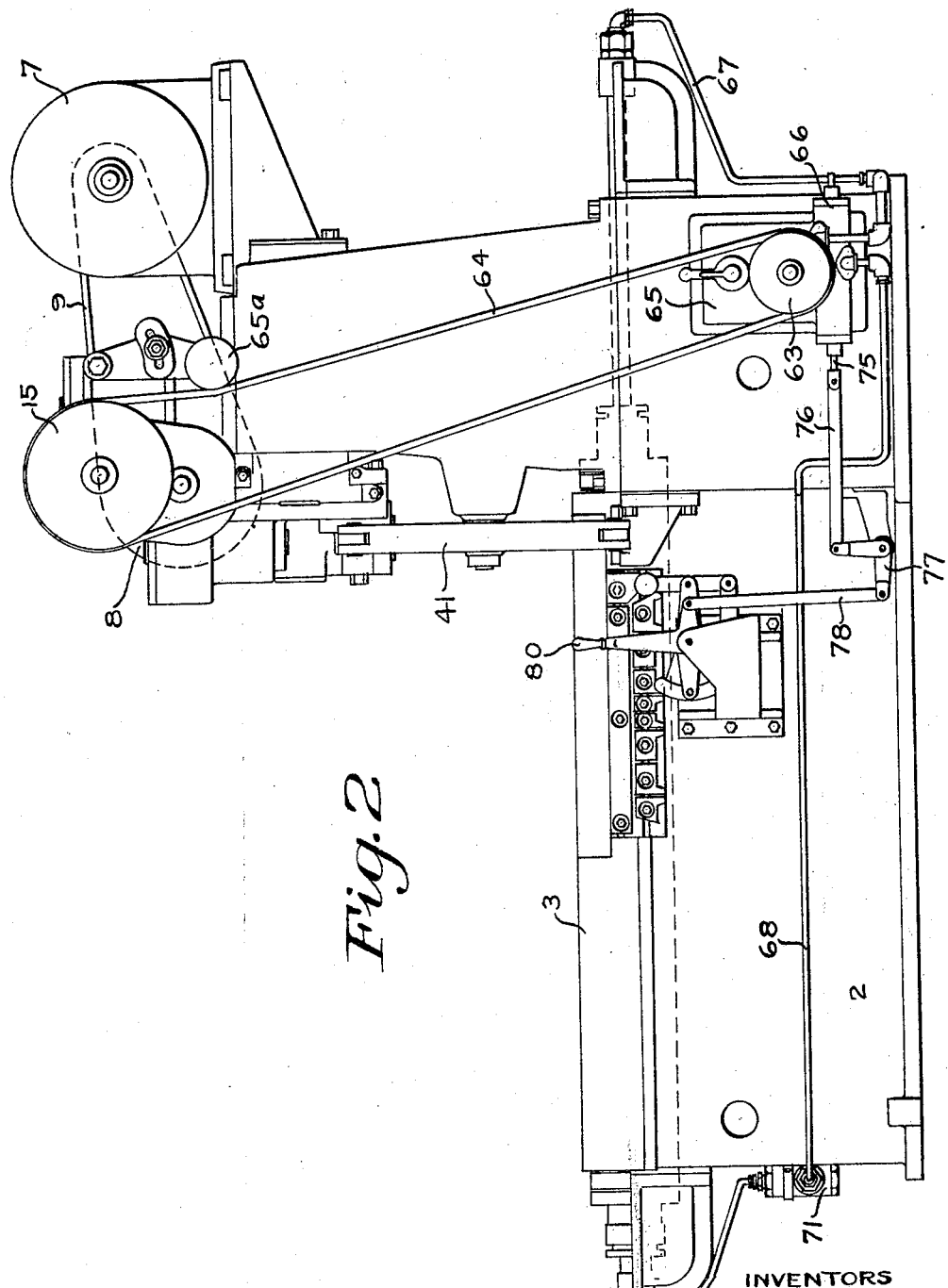

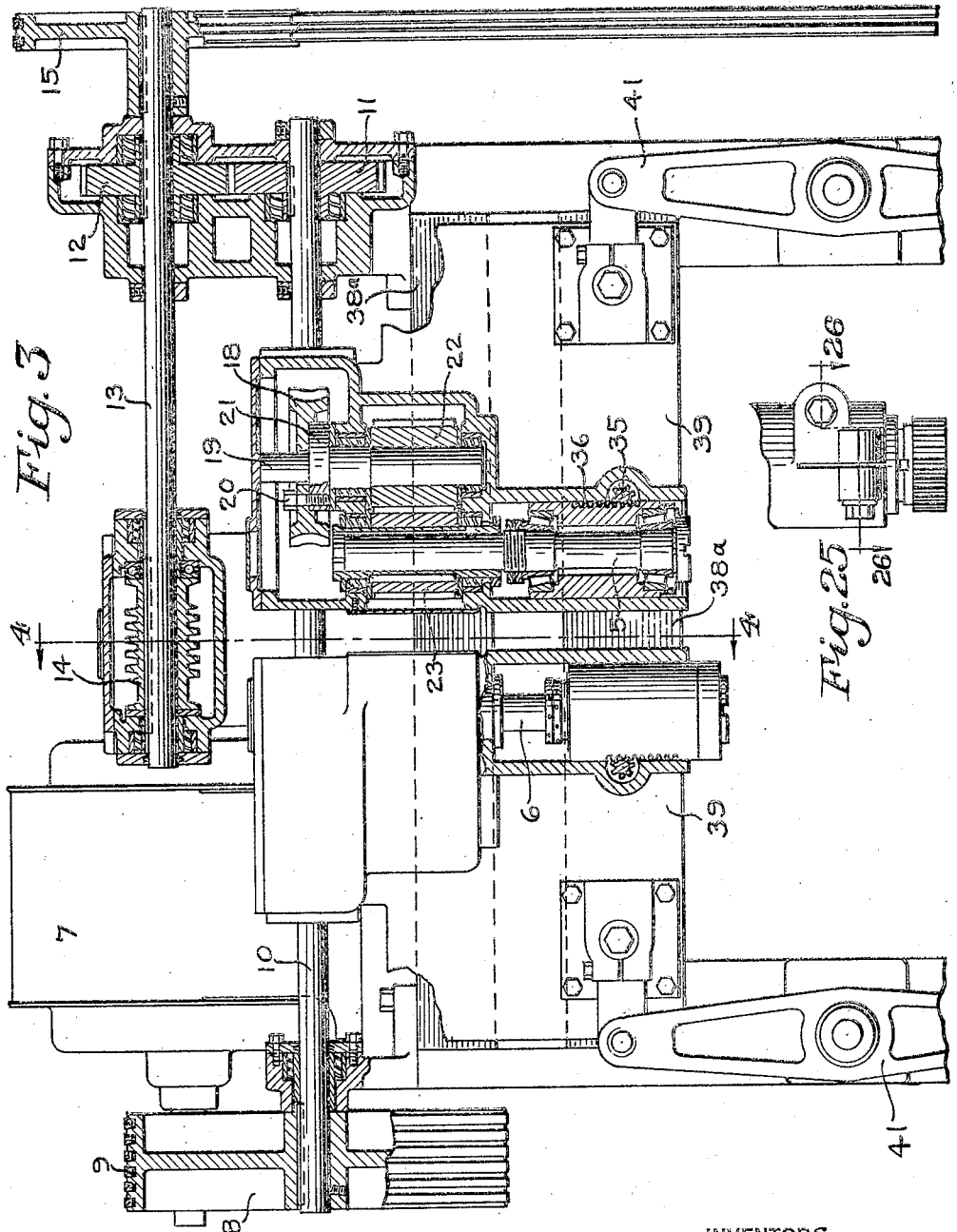

INVENTORS
R. Russell Roberts and Worthy J. F. Forward
BY Harold E. Stonebraker
THEIR ATTORNEY

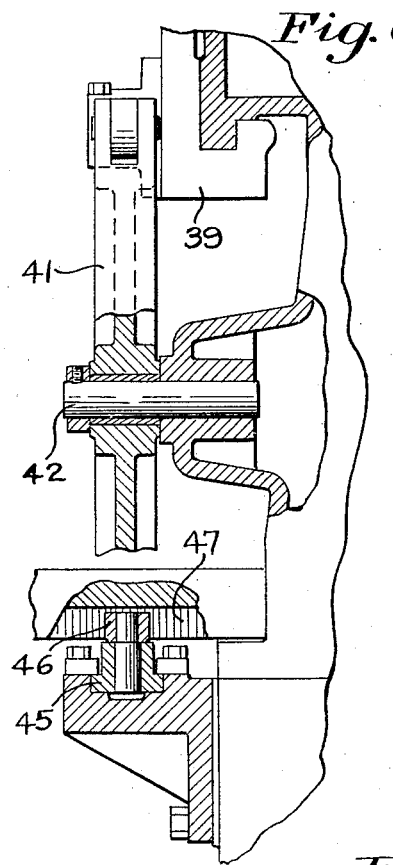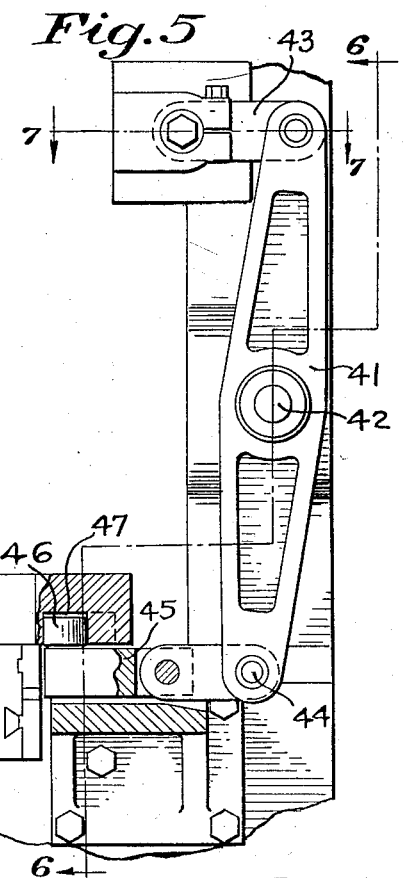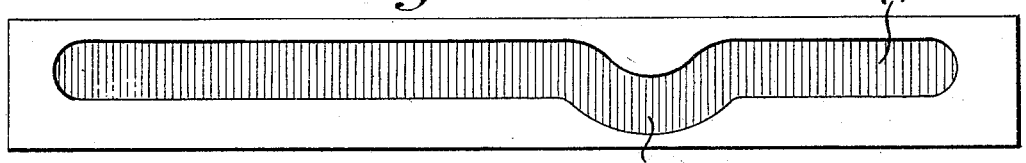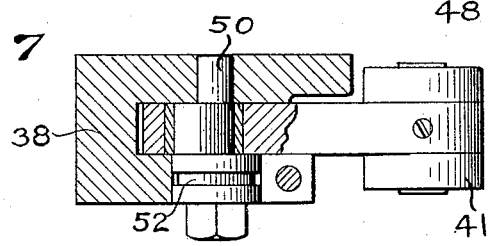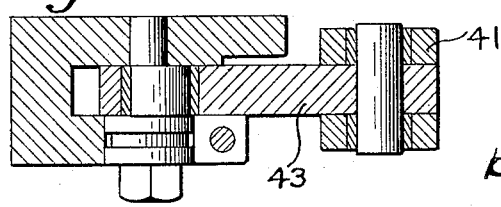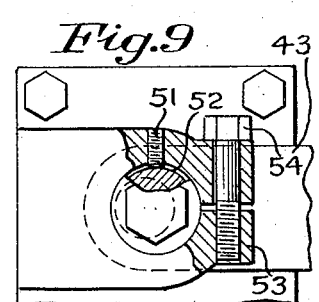

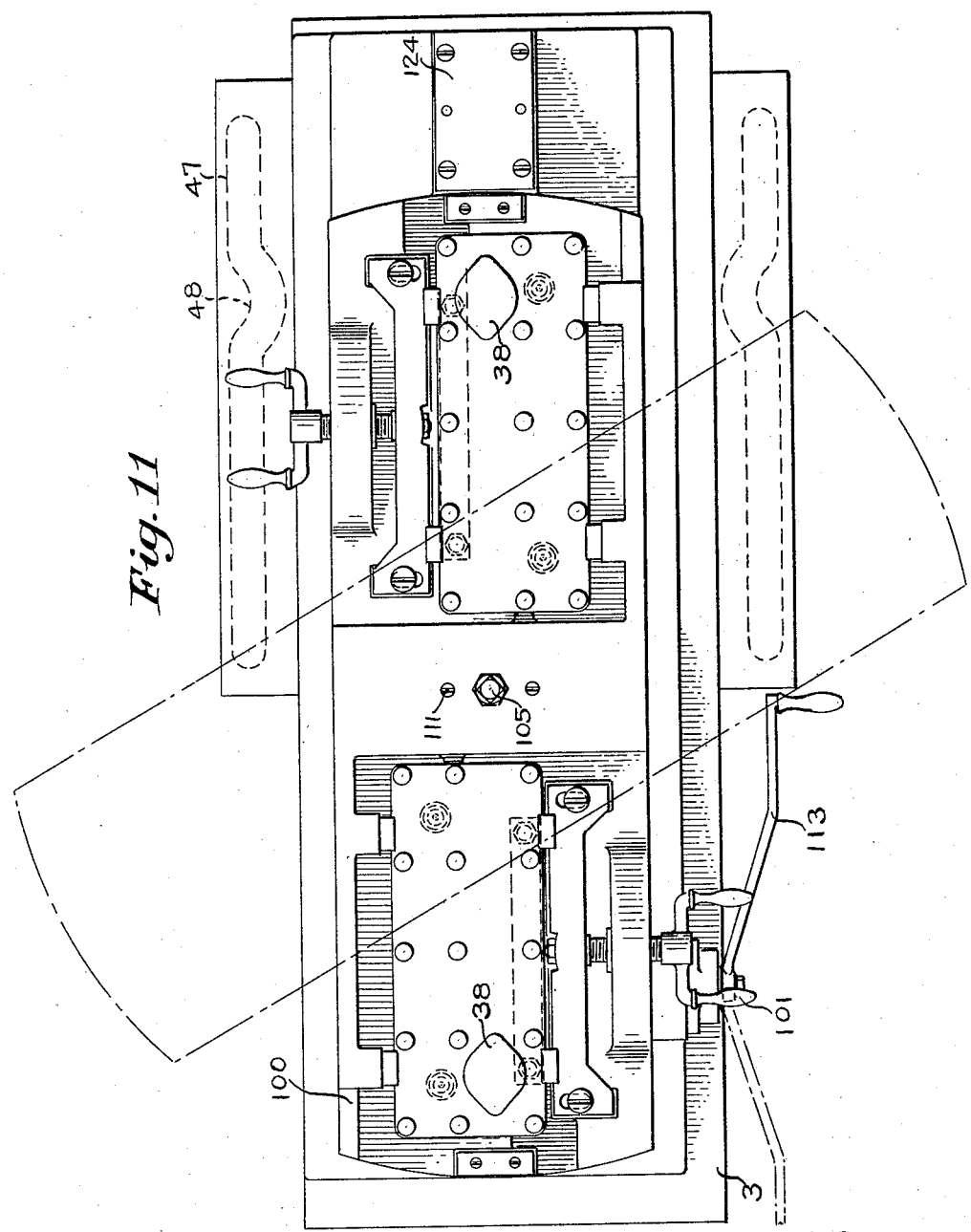

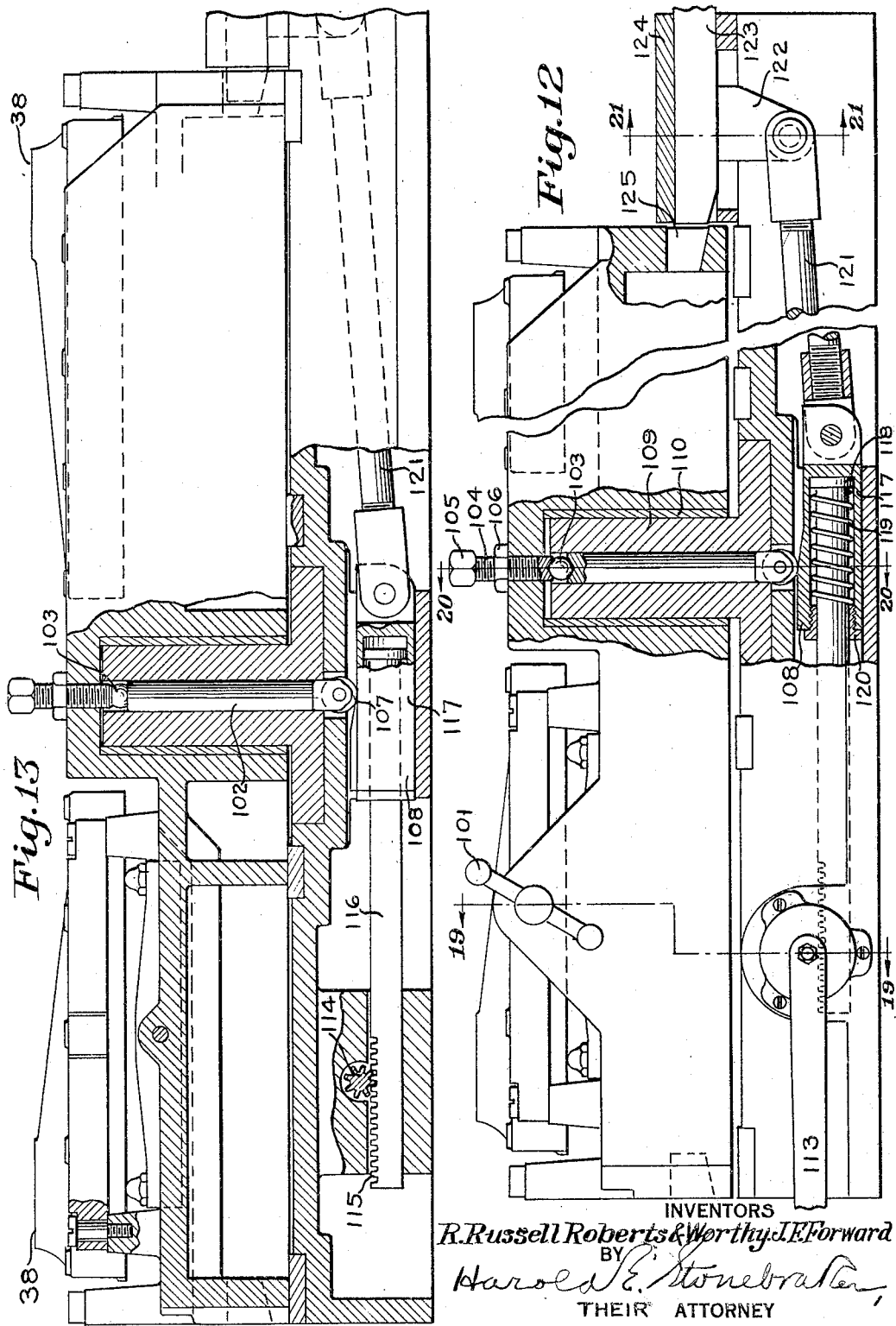

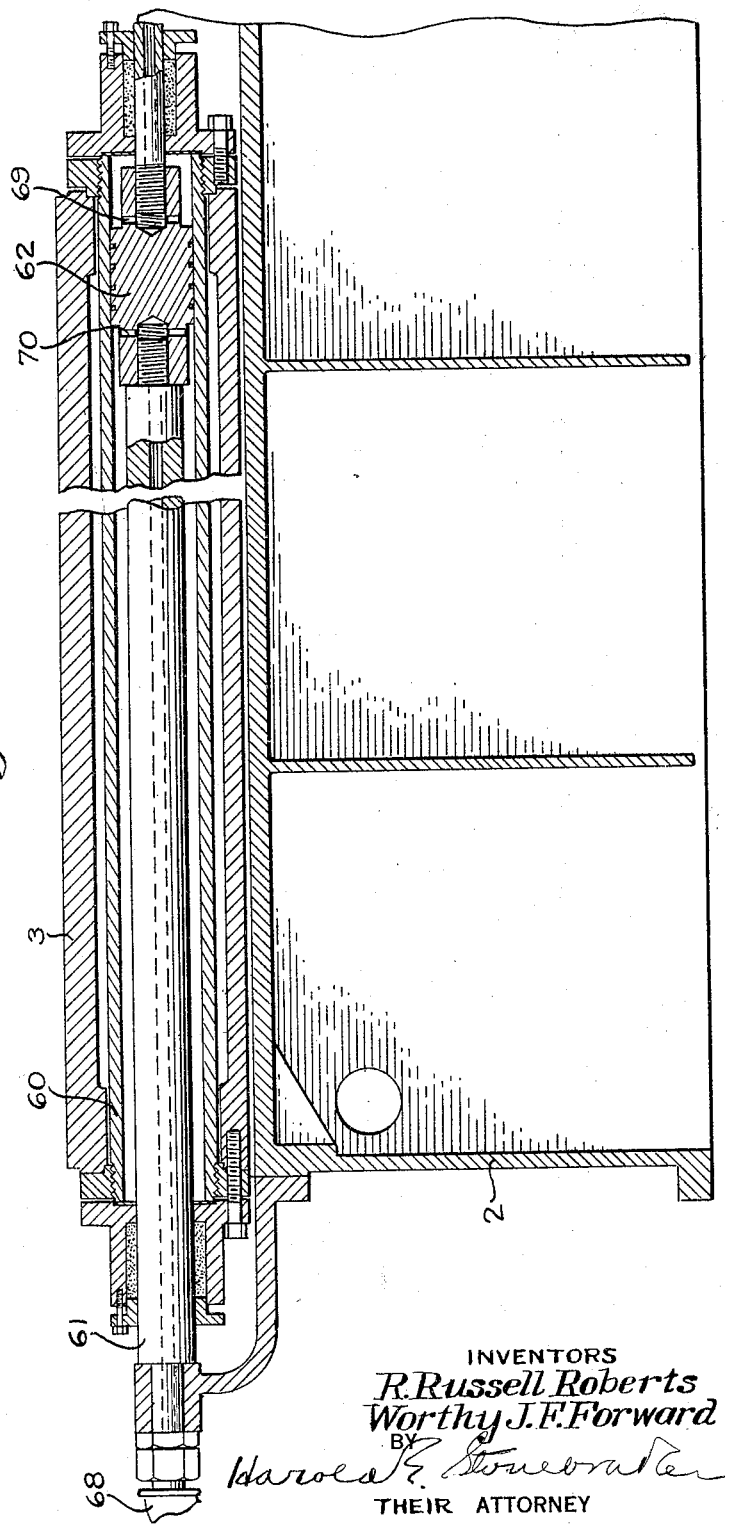

INVENTORS
R. Russell Roberts and Worthy J. F. Forward
BY Harold E. Stonebraker
THEIR ATTORNEY

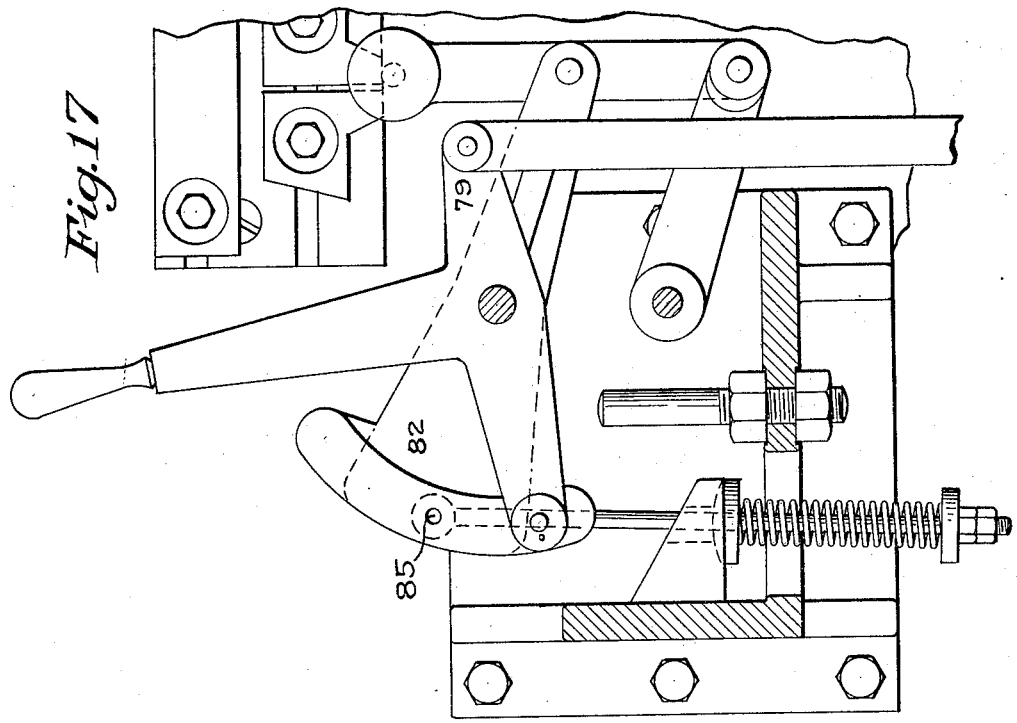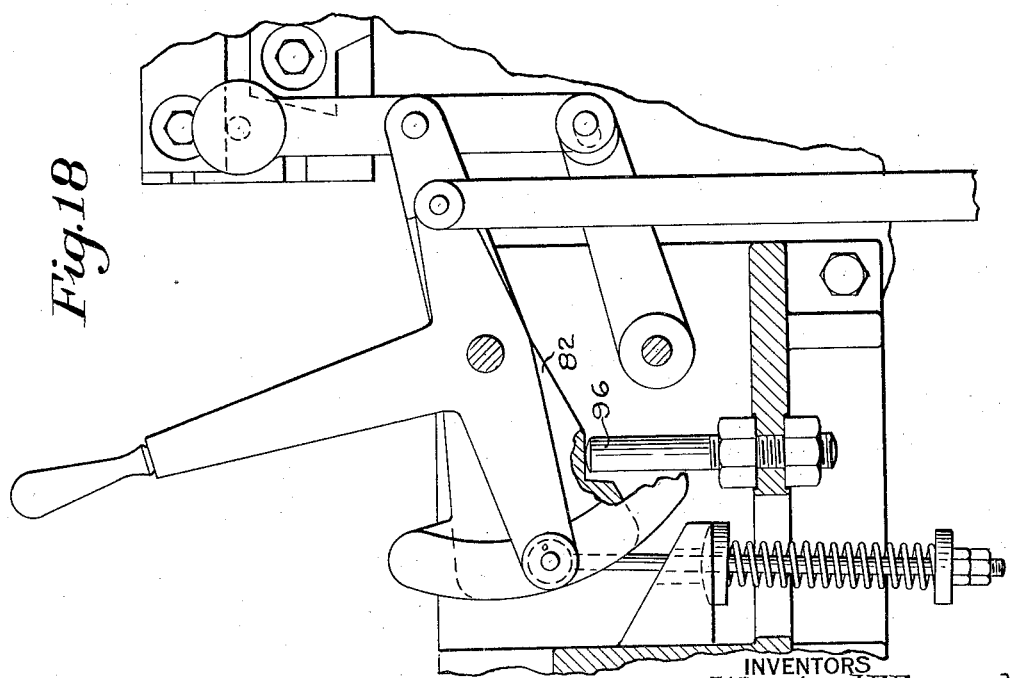

Aug. 23, 1932.  W. J. F. FORWARD ET AL  1,873,375
MACHINE TOOL
Filed July 15, 1929   11 Sheets-Sheet 11
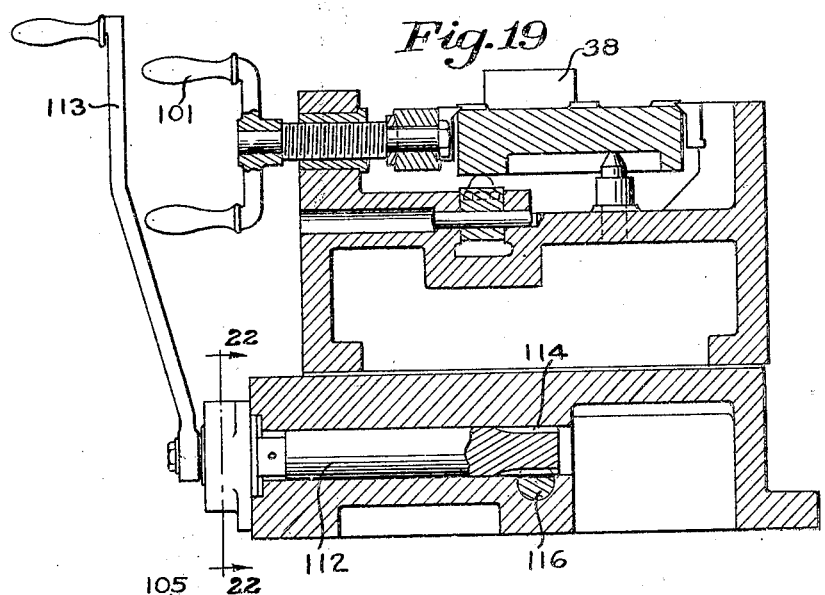
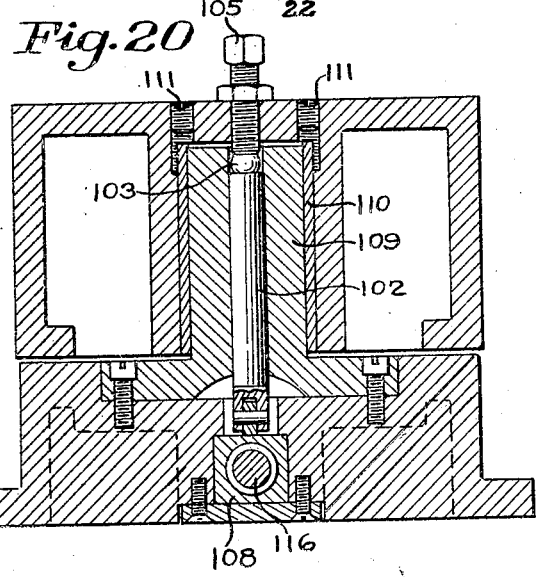
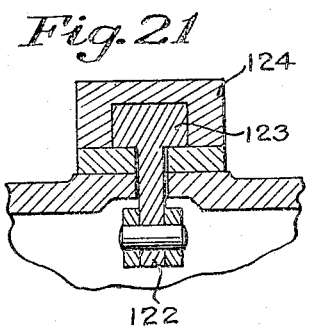
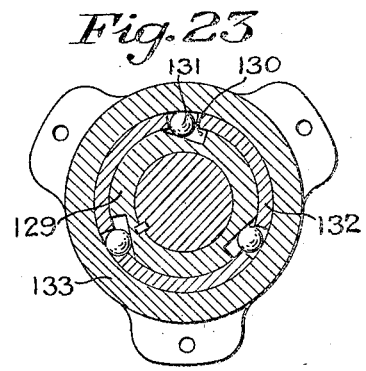
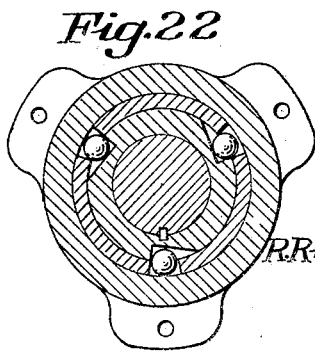
INVENTORS
R. Russell Roberts and Worthy J. F. Forward
BY Harold E. Stonebraker
THEIR ATTORNEY Patented Aug. 23, 1932

1,873,375

UNITED STATES PATENT OFFICE

WORTHY J. F. FORWARD AND ROLAND RUSSELL ROBERTS, OF ROCHESTER, NEW YORK, ASSIGNORS TO CONSOLIDATED MACHINE TOOL CORPORATION OF AMERICA, OF ROCHESTER, NEW YORK, A CORPORATION OF DELAWARE

MACHINE TOOL

Application filed July 15, 1929. Serial No. 378,551.

This invention relates to improvements in machine tools, especially to that class of machine tools known as multiple spindle milling machines.

The object of the invention is to provide a machine of this class having a movable carriage for the work piece and means actuated by the movement of the carriage for imparting lateral movements to the tool spindles so that they do not strike against projections on the work piece which might break or otherwise injure the tools.

Another object of the invention is to provide a machine of this kind having a plurality of tool spindles, a carriage for the work piece movable relatively to the spindles, and means actuated by the movement of the carriage for moving the spindles transversely of the movement of the carriage to avoid collision between the tools and projections on the work piece.

More particularly, the object of the invention is to provide a machine of this class having a plurality of spindles movable laterally transversely of the direction of movement of the work carriage to avoid collision with the work piece, and means on the carriage for moving the spindles laterally.

To these and other ends, the invention consists in the construction and arrangement of parts that will appear from the following description when read in conjunction with the accompanying drawings, the novel features being pointed out in the claims following the specification.

In the drawings:

Figure 2 is a side elevation of the same;

Figure 3 is a fragmentary front elevation, parts being sectioned away to illustrate details;

Figure 5 illustrates the means for imparting transverse movement to the tool spindles;

Figure 6 is a section on line 6—6 of Figure 5;

Figure 7 is a section on line 7—7 of Figure 5;

Figure 8 is a view similar to Figure 7 but showing parts in another position;

Figure 9 shows another view of the devices illustrated in Figures 7 and 8;

Figure 10 is a detail view of a camway which controls the movement of the tool spindles;

Figure 11 is a plan view of a work carrier;

Figure 12 is a fragmentary side elevation of the same, parts being shown in section to illustrate details;

Figure 13 is a similar view showing parts in another position;

Figure 14 is a fragmentary side elevation partly in section of fluid pressure operated devices for moving the carriage;

Figures 17 and 18 are views similar to Figure 15 but showing parts in other positions;

Figure 19 is a section on line 19—19 of Figure 12, looking in the direction of the arrow and showing the work table in locked position;

Figure 20 is a section on line 20—20 of Figure 12, looking in the direction of the arrow but showing the table in locked position;

Figure 21 is a section on line 21—21 of Figure 12 looking in the direction of the arrow;

Figure 22 is a section on line 22—22 of Figure 19, looking in the direction of the arrow;

Figure 23 is a similar view showing parts in other positions;

Figure 25 is a fragmentary detail of devices for adjusting a spindle;

Similar reference numerals refer to the same parts in all the figures of the drawings.

The invention is illustrated as embodied in a milling machine especially adapted for milling the parts of cylinder heads of internal combustion engines. Said head usually has an elevated central part adjacent one end to which the pipe connecting with the radiator is attached and a plurality of bolt openings arranged in lines adjacent the sides. The surface of the head is usually slightly elevated adjacent the openings to form bosses which are to be milled and also the part adjacent the radiator connection. The machine illustrated for doing this comprises three tool spindles, a central one adapted to co-operate with the part to which the water pipe is connected and two lateral spindles adapted to cooperate with the parts adjacent the bolt openings. The work piece is mounted on a work carriage and moves relatively to the spindles.

Figure 4:
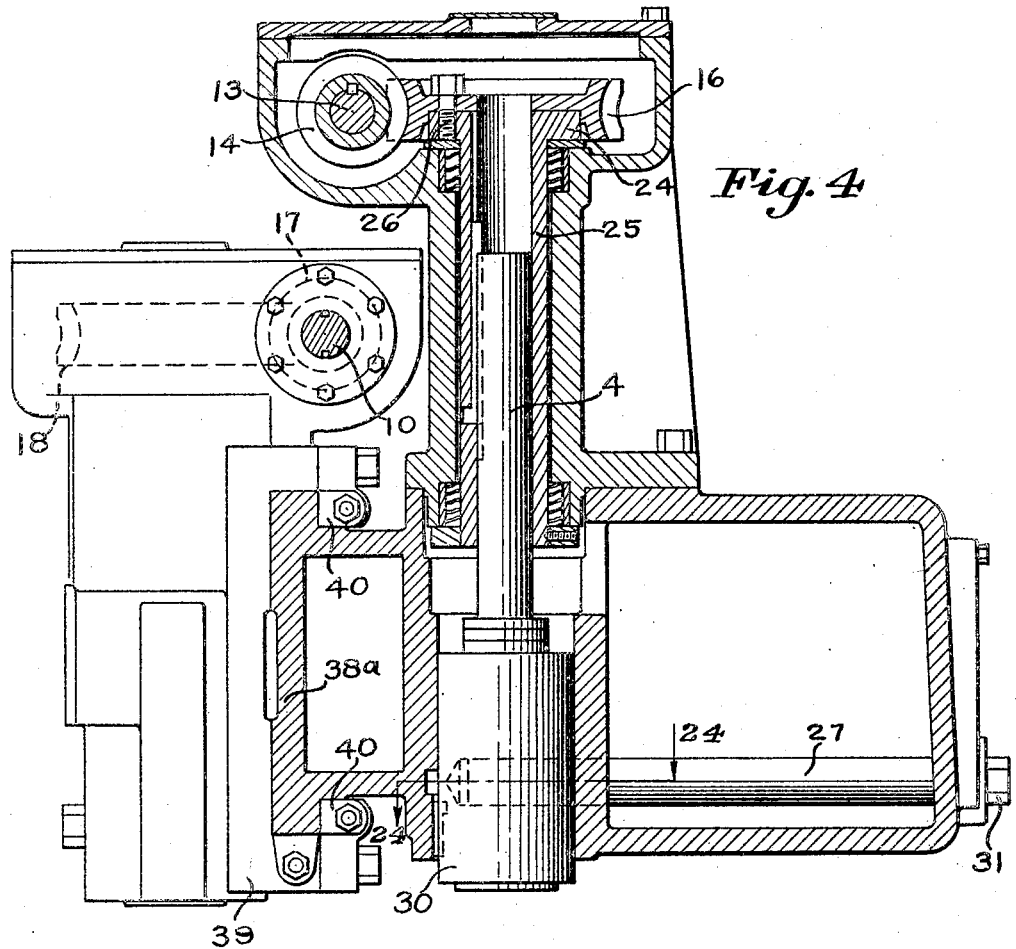
Figure 4 is a vertical section taken substantially on line 4—4 of Figure 3.

Referring particularly to the drawings, the machine comprises a frame 1 having a forwardly extending portion 2 on which is mounted a movable work carriage 3. Arranged above the path of the carriage are a plurality of work spindles 4, 5 and 6, see Figures 3 and 4. The spindle 4 is stationary and arranged to the rear of the spindles 5 and 6 which are movable laterally toward and from the spindle 4. Means are provided for rotating the spindles comprising a motor 7, the shaft of which is operatively connected with a pulley 8 by means of flexible belts 9. The pulley 8 is fixed to one end of a shaft 10 extending transversely of the frame and having a gear 11 keyed to its other end. The gear 11 meshes with a gear 12 keyed to a shaft 13 having a worm 14 keyed to its inner end and a pulley 15 keyed to its outer end, the function of which will be presently described. The worm 14 meshes with a worm gear 16, Figure 4, operatively connected to the spindle 4.

Splined on the shaft 10 for longitudinal movement thereon but rotation therewith are the worms 17, each of which meshes with a worm wheel 18 secured to the upper end of an arbor 19 by means of a headed screw 20 engaging a collar 21 fixed to the arbor and serving as a thrust bearing therefor. Mounted on the arbor to turn therewith is a gear or pinion 22 which meshes with a gear or pinion 23 keyed to the spindle to turn therewith but permitting relative adjustment. Except for the left hand arrangement of the parts, the gearing connection to the spindle 6 is the same as for the spindle 5 and need not be described in detail.

It will now be understood that turning movements are transmitted to the spindles 5 and 6 from the shaft 10 through the worms 17, gears 18, 22 and 23, and to the spindle 4 through the gears 11 and 12, shaft 13, worm 14 and gear 16. It will also be understood that these gears may be enclosed in the usual housings and the usual roller or other bearings provided as usual in this art.

Figure 24:
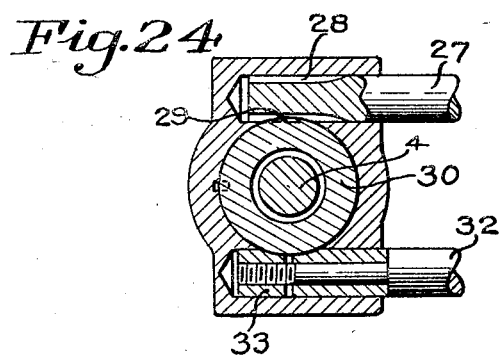
Figure 24 is a section on line 24—24 of Figure 4 looking in the direction of the arrow at said line.

The worm gear 16 is secured to a flange 24 formed on the upper end of a sleeve 25 by means of a headed bolt 26. The flange 24 forms a thrust bearing for the sleeve to which the spindle 4 is keyed for turning movements therewith but adjustable relatively thereto. The spindle 4 is adjusted vertically to and from the work, see Figures 4 and 24, by means of a forwardly extending shaft 27 provided with teeth 28 at its forward end which engage the teeth of a rack 29 provided on a bearing member 30 for the spindle. The rear end of the shaft 27 may be made angular in cross-section, as at 31, for engagement with a suitable tool, and the member 30 is frictionally held in adjusted position by means of the bolt 32 and nut 33 having concaved portions adapted to be wedge against its periphery.

Figure 26:
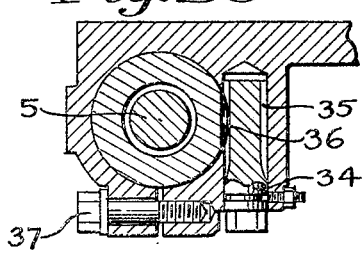
Figure 26 is a section on line 26—26 of Figure 25 looking in the direction of the arrow at said line.

It is desirable that the spindles 5 and 6 also be adjustable vertically. To this end, a shaft 34 has a pinion 35 formed thereon which engages a rack 36 formed on the bearing in which the lower end of the spindle is mounted, see Figures 25 and 26. The casing for the bearing is slotted and a headed screw 37 serves to hold the casing in frictional engagement with the bearing to secure it in adjusted position.

Adjacent one end of the work piece as at 38, see Figures 11 and 13, is a wide projection which is in the path of the tools on the spindles 5 and 6. It is therefore desirable that said spindles deviate from the line of movement of the work piece to avoid collision between said projection and the tools. To this end, there is provided a forwardly projecting guideway 38$^a$ on the frame and each of the spindles is mounted on a carriage 39 slidably mounted on the guideway, and oppositely projecting lugs 40 hold them in position thereon.

In operation, it is desirable that the spindles move automatically out of the path of the projection on the work piece so that there is no possibility of collision between them and the projection thereon. To this end, means are provided for moving the spindle carriages laterally, said means being actuated automatically by means on the work carrier. Since the mechanism for moving the carriages is substantially the same for both, only one will be described in detail.

Said mechanism comprises a lever or walking beam 41 pivoted at 42 intermediate its ends. A link 43 is connected to one end of the lever and pivotally connected at its other end to the carriage 39. The opposite end of the lever is pivoted at 44 to a link connecting it with a follower 45 slidably mounted in the base of the machine. The follower extends inwardly from its pivot, and at its inner end has a lug or projection 46 which engages a cam slot 47 on the work carrier. The slot 47 has a curvilinear portion 48 intermediate its ends. By this arrangement, it will be understood that as the work carrier moves toward or from the tool spindles, the projection on the slide 45 follows the camway 47 and holds the lever 41 stationary on its pivot while following the straight portions adjacent the ends of the camway. When, however, the projection engages the curved portion 48 of the camway, the lever 41 swings on its pivot to move the carriage and its spindle transversely of the movement of the work carriage. The parts are so arranged that this movement takes place at the time when the projection on the work piece passes the tools on the spindles.

The position of the parts to be operated on, also the positions of the projection on the work piece, may vary slightly with different jobs to be performed. It is therefore desirable to provide means for adjusting the spindles relatively to the lever 41. By referring to Figures 7, 8 and 9, it will be noted that the inner end of the link 43 is mounted on an eccentric pin 50, rotation of which varies the distance between the center of the spindle and the axis of the lever 41. The pin 50 is held against axial movement by means of a threaded screw 51 which engages a circumferential groove 52 in the pin, and against turning movement by frictional means, comprising a split collar 53 engaged by the headed screw 54. By loosening the screw 54, the headed pin 50 may be turned by means of a suitable tool to effect the required adjustment.

Mounted on the base of the machine is a work carriage 3 which is movable on a guideway provided therefor to carry the work piece to and from operative engagement with the tools carried on the tool spindles. Hydraulic devices are provided for moving the work carriage. Said devices comprise a hydraulic piston cylinder 60 of usual or preferred construction mounted on the lower side of the carriage and slidably engaging a piston rod 61 fixed in the top of the machine base and arranged in the direction of the carriage movement. Fixed to the piston rod within the cylinder is a suitable piston 62. It will be noted that the piston rod is shown as comprising two parts for convenience in assembling, but operates as a single rod. Admission of fluid or hydraulic pressure to one end or the other of the cylinder moves it and the carriage to move the work piece to and from operative engagement with the tools.

The hydraulic or fluid pressure is supplied by a variable speed oil pump 65 of well known type and driven by a pulley 63 operatively connected with the pulley 15 by the flexible belt 64. An idler 65$^a$ may adjustably engage the belt 64 to keep it taut. The variable speed pump 65 is controlled by a valve 66 and is adapted to deliver hydraulic pressure in either direction and at variable speeds, as is understood by those skilled in the art. From the valve 66 the liquid is conducted to opposite sides of the piston in the cylinder through the pipes 67 and 68 which enter opposite ends of the piston rod 61 which has central passageways communicating with the interior of the cylinder at 69 and 70 on opposite ends of the piston. If desired, an air valve 71 of usual construction may be arranged in one of the pipes 67 or 68.

Means are provided for controlling the valve 66 either automatically by the movement of the carriage or manually to move the work carriage quickly step by step to the several points where work is to be performed on the work piece, and more slowly to feed the work to the tools while operations are being performed thereon. To this end, the stem 75 of the valve 66 is connected by a link 76 to one arm of a bell crank lever 77 pivoted to the base of the machine. The other arm of the bell crank is connected by a link 78 with an arm of a lever 79 pivoted on the base of the machine, and provided with the hand piece 80, see Figures 15 to 18 inclusive. Movement of the hand piece in one direction or the other controls the pump valve 66 and the flow of the liquid from the pump to the cylinder 60.

Figure 1:
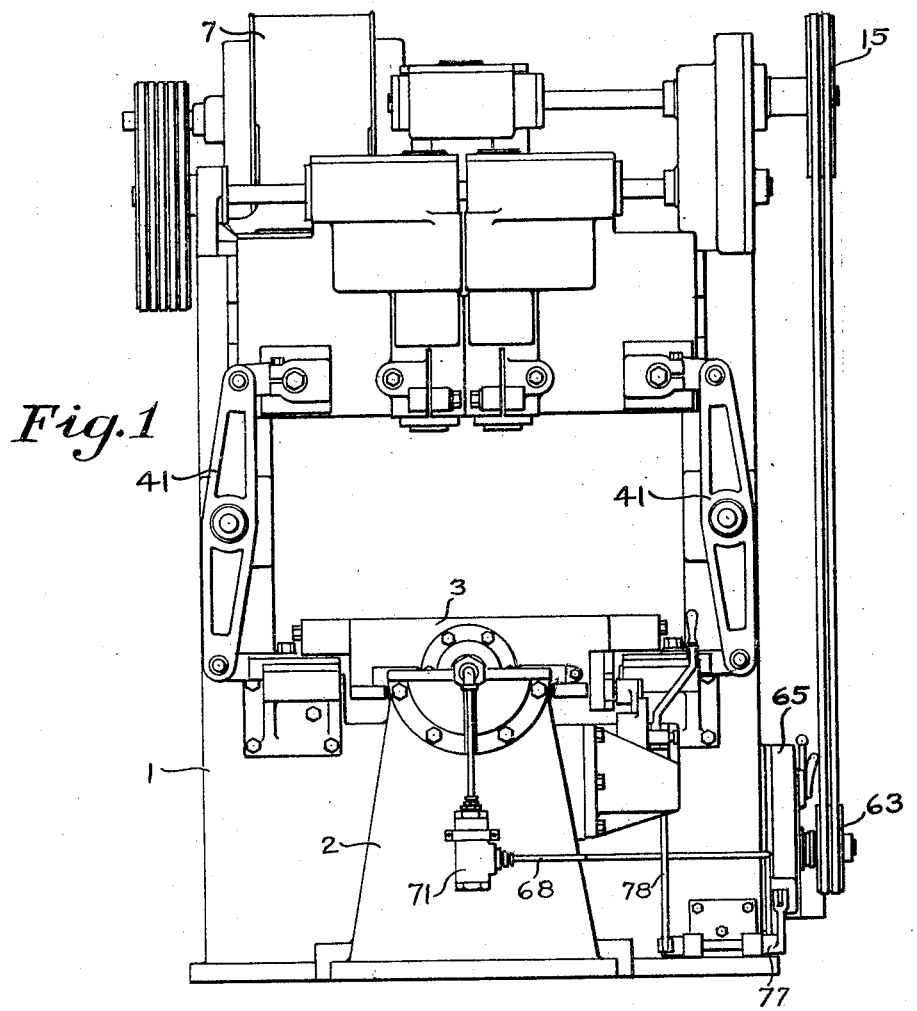
Figure 1 is a front elevation of a machine constructed according to one embodiment of the invention.
Figure 27:
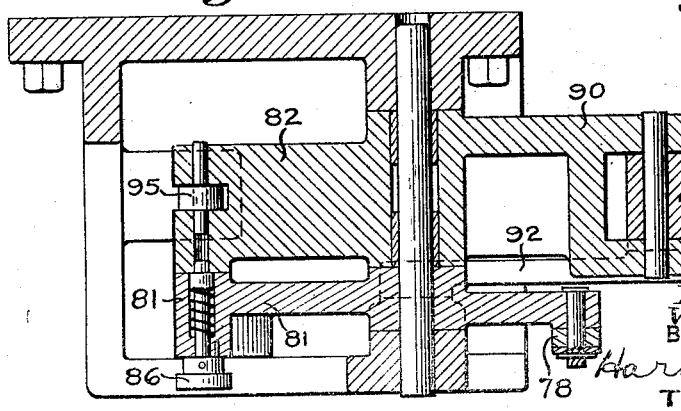
Figure 27 is a fragmentary sectional view showing interlocking devices between the manual and automatic devices for controlling the movements of the work carriage.
Figure 28:
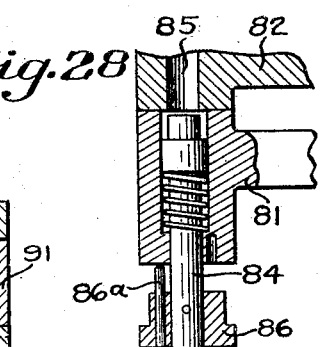
Figure 28 is a similar view showing the locking devices disengaged.

The lever 79 has an arm 81 adapted to be connected with an arm 82 of a concentrically pivoted lever 83. To this end, the arm 81 is provided with a spring pressed locking device in the form of a pin 84, see Figures 27 and 28, adapted to engage an opening 85 provided therefor in the arm 82. The outer end of the pin has a head or thumb piece 86 whereby it may be disengaged from the arm 82, and a stud 86$^a$ serves to lock it in disengaged position when turned out of alinement with an opening provided therefor in the arm 81. The arm 82 may be provided with an arcuate portion 87 on which the pin 84 may slide until it comes into position to snap into the opening, under the action of its spring.

The other arm 90 of the lever 83 is pivotally connected to a link 91 which is pivoted to an arm 92 which in turn is pivoted to the base of the machine. The end of the arm or link 91 carries a follower 93 which is adapted to engage a camway 94 conveniently arranged on the work carriage. A spring pressed arm 95 is connected to the lever 82 and operates to hold the follower 93 resiliently in engagement with the camway. As the camway moves with the carriage the follower moves along the camway and operates to swing the lever 82 on its pivot and also the lever 79 connected thereto, which movement is transmitted to the control valve through the link 78.

Figure 15:
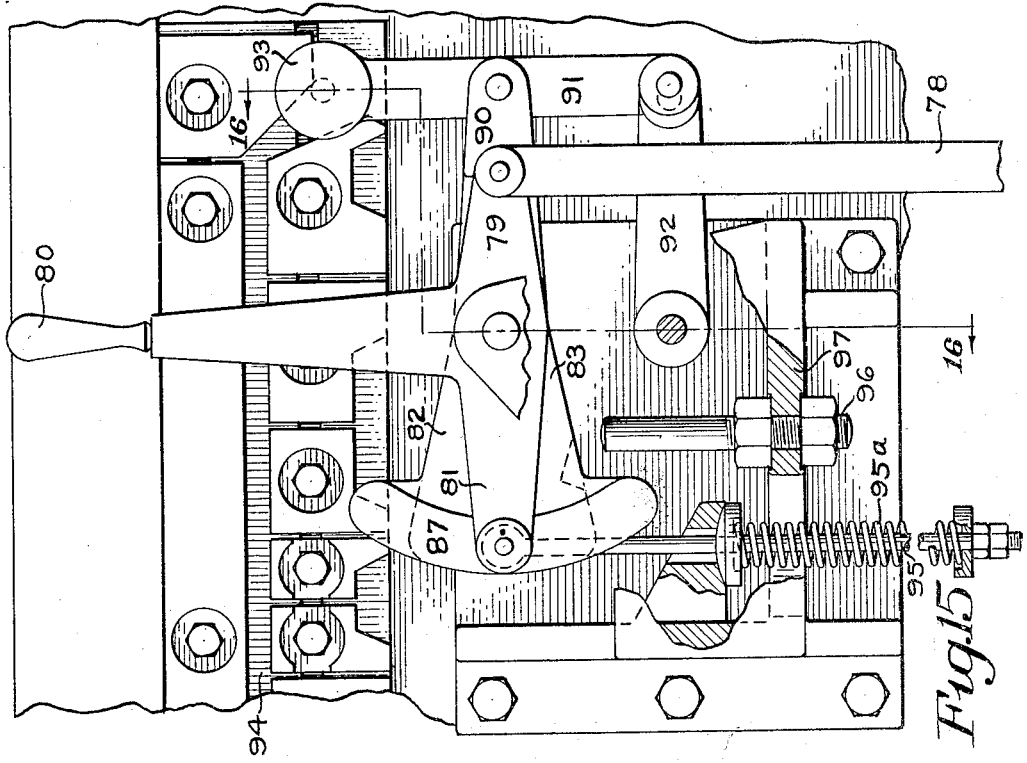
Figure 15 is a side elevation of devices for controlling the movement of the carriage.
Figure 16:
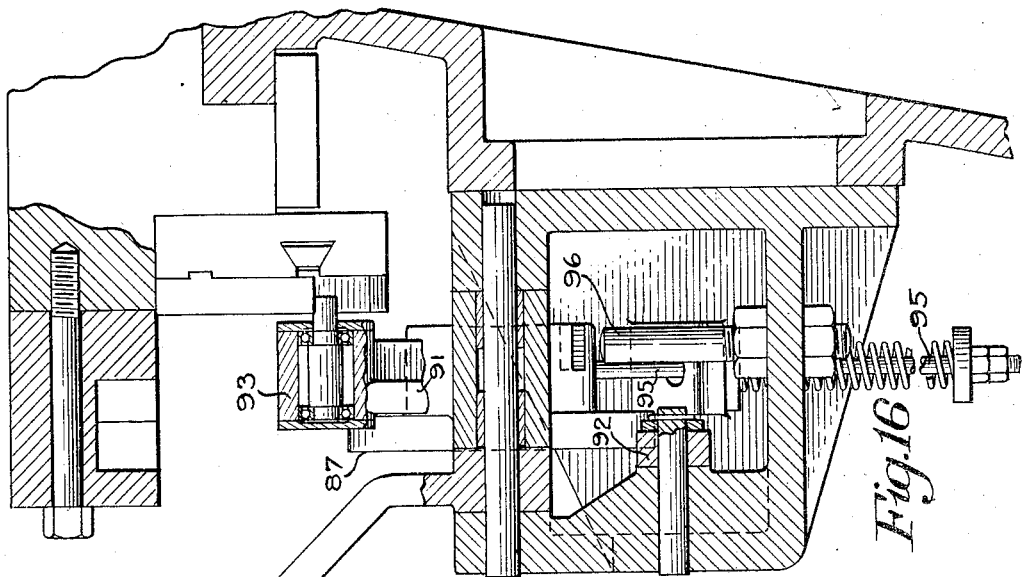
Figure 16 is a section on line 16—16 of Figure 15 looking in the direction of the arrow at said line.

The camway is arranged to automatically control the movements of the work carriage so that it moves quickly from operative to operative position, more slowly while the work is being operated on by the tools, and so that the direction of movement is reversed and quickly returned to the starting point and then stopped when the work on the work piece is finished. Figure 15 shows the position of the follower in the cam slot and parts which control the pump valve when the carriage is at rest before operations on the work piece. Movement of the hand piece to the right moves the follower from the end of the slot and starts the pump to move the carriage forwardly and the follower then engages the lower side of the camway under the action of the spring pressed member 95.

Figure 17 shows the position of the parts when the work piece is nearly complete, and Figure 18 shows the position of the parts when the operations on the work piece are complete and the follower moved to the position for returning the carriage.

When the follower reaches the end of the lower side of the camway, the action of the spring 95$^a$ moves it to the Figure 18 position with considerable force and there is danger of excessive wear or injury to the parts. To overcome this, means are provided for stopping the movement of the lever 82 to prevent impact between the follower and the slot. Said means comprises a stop 96 adjustably mounted on a flange 97 provided therefor on the machine base, and projecting into the path of the lever 82.

Mounted on the carriage is a work table on which the work piece is mounted. In the embodiment illustrated herein, the work table 100 is pivoted on the carriage intermediate its ends and adapted to carry two work pieces, so that it may be turned when a work piece is finished and the finished work removed and a new one mounted in its place while the work piece on the other end of the table is being operated on by the machine.

The work piece may be secured to the work table by any suitable or convenient means. In the embodiment illustrated, the work piece is secured to the table by means of clamping devices operated by the hand piece 101. Since these devices are well known in the art and form no part of the present invention, detailed description thereof is deemed unnecessary.

The work table normally rests on the carriage and turns on a pivot 102 which may be elevated to raise the table from the carriage when it is rotated thereon, means being also provided for locking the table to the carriage while operations are being performed on the work piece. The post 102 supports a roller bearing 103 at its upper end on which a stub post 104 is adapted to turn. The post 104 is threaded in the table and provided with an angular head 105 for engagement with a suitable tool to adjust it relatively to the table. A lock nut 106 secures it against accidental turning movements. At its lower end, the post 102 has a roller 107 pivoted thereto which rests on a movable cam block 108.

By reference to Figures 12 and 13, it will be noted that when the cam block is in the position shown in Figure 13, the table is in normal operative position. When, however, the cam is moved to the position shown in Figure 12, the roller 107 rides up the cam and raises the table free of the carriage. The work table turns on a bearing 109 in which the post 102 is mounted. The bearing may have a bushing 110 and the screws 111 are provided for removing this bushing when it becomes worn.

Manually operated means are provided for moving the cam block 108 and also for locking the work table against accidental turning movement on the work carriage. To this end, a transversely arranged shaft 112 is revolubly mounted in the carriage and has a hand piece or crank 113 at its outer end by which it may be turned. At its inner end the shaft has a pinion 114 which engages a rack 115 on a longitudinally arranged rod 116. The rod 116 is resiliently connected with a sleeve 117 on which the cam block 108 is carried. For this purpose, the rod 116 has a head or block 118 secured to its end which projects into the sleeve and a spring 119 is coiled about the rod and anchored at one end against the block. The other end of the sleeve is closed by means of a nipple 120 loose on the rod and threaded into the sleeve and which engages the other end of the spring. By this arrangement, it will be noted that when the hand piece 113 is turned, assuming the parts to be in the Figure 12 position, the rod 116 is moved against the tension of the spring and moves the sleeve and with it the cam block 108 to the Figure 13 position.

Pivotally connected with the sleeve 117 is an extensible rod 121 pivotally connected at its other end with a depending ear 122 on a locking member 123 slidably mounted at the rear end of the carriage. The locking member is mounted in a housing 124 provided therefor and is adapted to engage an opening 125 provided therefor in the work table. When the locking member 123 is in the position shown in Figure 12, the work table is free to be turned on its pivot. When, however, it is moved to the Figure 13 position, the work table is locked to the carriage. It will be noted that the hand piece 113 controls both the cam block 108 and the locking member 123 which operate simultaneously to unlock and raise the work table or lower and lock the work table.

Means are also provided for locking the shaft 112 against accidental rotation. To this end, a ring 129 having a plurality of cam slots or recesses 130 is keyed to the shaft to turn therewith. Cooperating with the cam slots 130 are the balls 131 mounted in a ball retaining ring 132 loosely surrounding the ring 129. When the hand piece 113 is turned to lock the work table, the radial faces of the cam slots engage the balls which occupy the wide ends of the slots and the shaft, ring 129 and ball retaining ring are free to turn as a unit relatively to the fixed bearing 133. The parts are shown in this position in Figure 22. When, however, the hand piece is turned in the reverse direction to raise and release the work table, the ring 129 turns with and relatively to the ball retaining ring to raise the work table until the Figure 23 position is reached, when the balls occupy the narrow ends of the slots and frictionally lock the parts against further movement in the same direction.

Briefly, the operation is as follows: The work piece is secured to the table and the hand piece 113 pulled forwardly to release the table which is then turned on its pivot to present the work piece to the machine. The motor being in operation, the lever 80 is actuated to move the follower from the end of the cam-way which sets the automatic hydraulic devices into operation to feed the work carriage to move the work piece into position to be operated upon by the tools. In the meantime, the operator removes the finished work piece and places a new one on the work table.

As the carriage moves forward, its movements are controlled by the follower 93 and camway 94 and the cam slot 47 controls the levers 41 to move the spindles laterally to avoid the projection on the work piece. When the operations on the work piece are complete, cooperation of the follower 93 with the camway 94 reverses the action of the hydraulic devices to return the carriage and stop it in its initial position.

While only one particular embodiment of the invention is described herein, it will be understood to include such changes or modifications as may come within the spirit and scope of the appended claims.

We claim:

1. In a machine tool, the combination of a work holder adapted to carry a work piece on which three lines of operations are to be performed, a revoluble tool spindle arranged in each of said lines of operation, means for moving the work holder to move the tool spindle to and from said work piece mounted on said work holder, and means for automatically moving two of the spindles out of said lines of operation while another spindle operates on the work piece.

2. In a machine tool, the combination of a pair of revoluble tool spindles, a holder for a work piece on which a pair of lines of operations are to be performed, one line corresponding to each of said tools and an elevated portion arranged between and adjacent said lines, means for moving said holder toward and from said spindles, carriages for said tool spindles movable toward and from each other laterally of the work holder, levers operatively connected with said carriages, and means controlled by said holder for actuating said levers to move said carriages laterally to permit the elevated portion of the work piece mounted on said work holder to pass between them.

3. In a machine tool, the combination of a pair of revoluble tool spindles, a holder for a work piece on which a pair of lines of operations are to be performed, one line corresponding to each of said tools and an elevated portion arranged between and adjacent said lines, means for moving said holder toward and from said spindles, carriages for said tool spindles movable toward and from each other laterally of the work holder, levers operatively connected with said carriages, camways on said holder, and means operatively connecting said levers with said camways for controlling the position of said spindles relatively to each other and moving them out of the path of said elevated portion of the work piece mounted on said work holder.

4. In a machine tool, the combination of a plurality of revoluble tool spindles, a holder for a work piece movable toward and from said spindles, said work piece having a plurality of parts to be operated upon, one corresponding to each of said spindles, and arranged in a plurality of planes spaced different distances from the work holder, one of said spindles being stationary and arranged to cooperate with said part of the work piece spaced at the greatest distance from the work holder, a guideway in which a plurality of said spindles are mounted for movement toward and from said stationary spindle and out of the path of that part of the work piece with which the stationary spindle cooperates when the work piece moves with the holder, means operatively connecting said movable spindles with the work holder for moving the spindles from and toward the stationary spindle, and means for driving said spindles.

5. In a machine tool, the combination of a plurality of revoluble tool spindles, a holder for a work piece movable toward and from said spindles, said work piece having a plurality of parts to be operated upon, one corresponding to each of said spindles, and arranged in a plurality of planes spaced different distances from the work holder, one of said spindles being stationary and arranged to cooperate with said part of the work piece spaced at the greatest distance from the work holder, a guideway in which a pair of spindles are mounted for movement toward and from said stationary spindle and out of the path of that part of the work piece with which the stationary spindle cooperates, a pair of oppositely movable arms each connected with one of said pair of spindles for moving them, camways on said work holder operatively connected with said arms for moving them, and means for driving said spindles.

In witness whereof, we have hereunto signed our names.

WORTHY J. F. FORWARD.
ROLAND RUSSELL ROBERTS.